Jan. 3, 1967  A. D. DROZDOV ETAL  3,296,492
DEVICE FOR RELAY PROTECTION OF RECTIFIER TRANSFORMERS
Filed Oct. 22, 1963

United States Patent Office 3,296,492
Patented Jan. 3, 1967

3,296,492
DEVICE FOR RELAY PROTECTION
OF RECTIFIER TRANSFORMERS
Alexandr Dmitrievich Drozdov and Alexandr Sergeevich Zasypkin, Novocherkassk, U.S.S.R., assignors to Novocherkassky Politekhnichesky Institut Sergo Ordzhonikidze, U.S.S.R., Novocherkassk
Filed Oct. 22, 1963, Ser. No. 317,892
3 Claims. (Cl. 317—14)

The present invention relates to transformer relay protection systems provided with secondary winding regulation. It can be employed in electric locomotives powered from A.C. lines.

At present, for transformer protection, maximum protection systems are mainly used; the settings of which are chosen so as to be twice the rated current of the transformer. However, the mentioned type of protection has the following disadvantages:

It is not sensitive to small turn-to-turn short circuits in the transformer;

It does not operate on short circuits between the regulating taps of the transformer secondary winding;

It does not react on short circuits in the secondary winding of the transformer provided with wide secondary voltage regulation when such transformers operate within lower limits of regulation;

The protection system does not operate on arcing back in the valves of the mercury-arc rectifiers in case the transformer is used in the rectifier unit.

Thus, for instance, the known protection system employing a saturable transformer and an executive relay is not sufficiently reliable.

Although attempts have been made to overcome the above-mentioned disadvantages, none of them, as far as we know, was a success in realizing protection of transformers provided with secondary voltage regulation.

In the broad sense, the claimed invention is designed for protection of any type of power transformers from overloads, short circuits, turn-to-turn short circuits, etc., and in particular, the invention may be used for protecting power transformers of the electric locomotives supplied from A.C. lines and provided with D.C. traction motors.

The object of the invention is to develop a transformer protection device which would react on current overloads two times exceeding the transformer rated current.

Another object of the invention is to develop a transformer protection system operating on arcing back in the valves of mercury-arc rectifiers connected in conventional manner by a secondary winding with the traction engine in the centertap and mercury arc rectifiers in each leg to supply D.C. to the engine from the primary or load winding.

Still another object of the invention is to develop a transformer protection system operating on short circuits in the secondary winding of transformers provided with wide secondary voltage regulation when such transformers operate within low limits of regulation.

The invention also ensures operation of the protection system when turn-to-turn short circuits in the transformer and short circuits between the secondary winding regulating taps occur.

In accordance with these and other objects, a highly sensitive protection system has been developed which reacts upon the rate of increase of power transformer current.

Other objects and advantages will become evident from the following description and drawings attached to it, in which.

Figure 1:
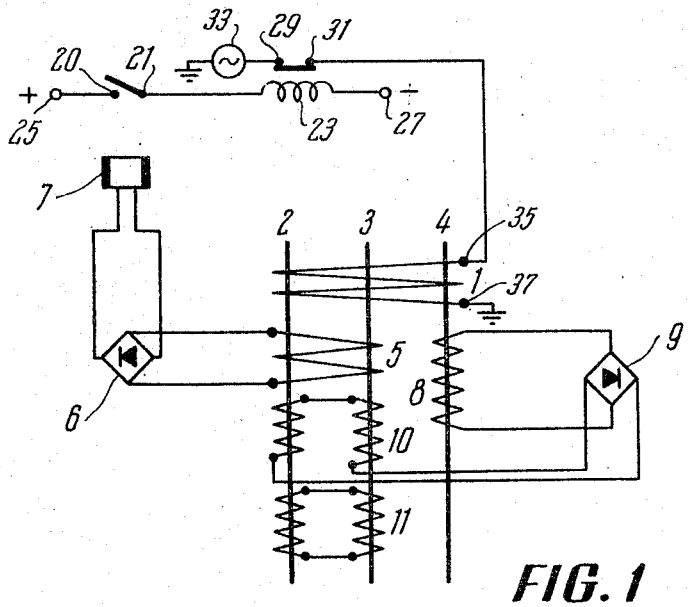
FIG. 1 shows the electric circuit diagram of the proposed system.

$1_1$ is the percentage of power transformer load current to the rated current of the transformer.

$\Delta 1_1$ is a jump-like increment of load current causing disconnection of power transformer circuit breaker, in percent to the rated current of the protected transformer.

$1_2 = 1_1 + \Delta 1_1$ is a summary load current at a sudden current increase by a value of $\Delta 1_1$, in percent to the rated current of protection system operation curve.

The primary winding 1 wound on three cores 2, 3, 4 or passing as a bus bar through the transformer windows is connected directly to the power transformer primary winding circuit, the load current of the transformer passing through it. Secondary winding 5 is wound over cores 2 and 3 and through rectifier 6 is connected to the coil of executive fast-operating relay 7. Auxiliary secondary winding 8 is wound on core 4 and feeds a braking winding 10 with D.C. through rectifier 9. The braking winding 10 incorporates two coils. One of them is wound on core 2 and the other on core 3. Both coils are connected in series opposition, i.e., so that the E.M.F.'s induced in them by the load current would be opposite in direction, and thus mutually compensated. Short-circuited winding 11 is also wound on cores 2 and 3. The short-circuited winding 11 is designed for time delay of the change in the braking magnetic flux.

Figure 2:
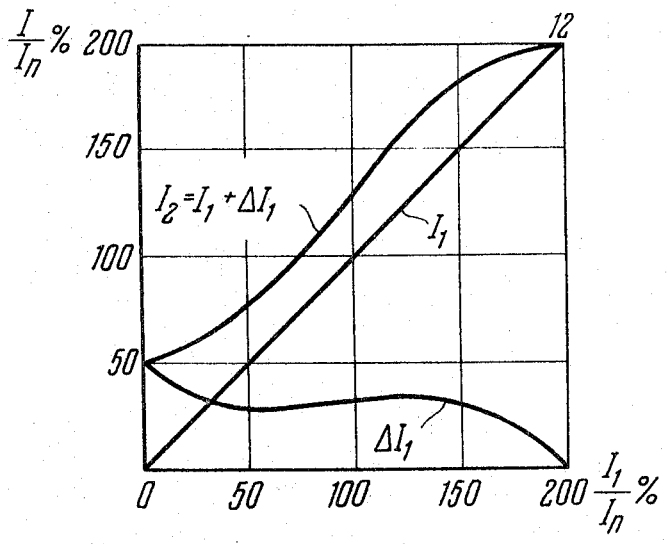
FIG. 2 represents the characteristic curve of the proposed system with the following symbols employed.

The protection works as follows. Upon a smooth increase of load current from 0 to 200 percent of the rated value, the transformer cores are saturated by the magnetic flux of the braking winding 10, the core reluctance increases. The executive relay 7 does not operate. Saturation is proportional to the power transformer load current. As soon as the value of the load current becomes twice the rated current value, the executive relay 7 operates. By means of the contacts 20 and 21 of this relay the load current is applied to the disconnecting electromagnet 23 of the power transformer circuit breaker thus tripping it. Normally, the electromagnet 23 is de-energized because relay contacts 20, 21 interrupt the circuit between plus terminal 25 and negative terminal 27. Energization of relay 7 energizes electromagnet 23 to open its contacts 29, 31 and disconnect source 33 from input terminals 35, 37 for winding 1. The abovesaid is evident from the protection system characteristic curve given in FIG. 2. Point 12 of the characteristic curve defines the conditions in which the protection system will operate.

Upon a jump-like change of current in the power transformer primary winding, the change of the braking magnetic flux is delayed in time, as compared with the magnetic flux in the primary winding 1, since with a sudden current increase in the braking winding 10, the E.M.F. is induced in the short-circuited winding 11 and there flows an electric current which opposes the increase of the magnetic flux in the cores 2, 3 and 4 of the transformer. Saturation in this case is not proportional to the current in the primary winding 1. In the secondary winding 5, E.M.F. is induced, sufficient to make the executive relay 7 operate and the transformer circuit breaker is tripped. As is obvious from the characteristic curve given in FIG. 2, a slight jump-like current increment in the power transformer, approximately equal to one-half of the rated current, is sufficient to make the protection system operate. This jump-like increment of the current results in disconnecting the transformer at any current in the power transformer primary winding.

High sensitivity of the proposed protection system to short circuits and arcing back in the valves of the mercury-arc rectifiers is due to the jump-like increase of current.

The protection system does not operate if the electric locomotive is normally loaded since the change of current when the controller is reset from one position to another, is comparatively slow, the time constant of the D.C. power circuit of the locomotive being high.

The protection system does not react on magnetic current surges of the protected transformer since these surges are aperiodic and fully shifted in the direction of saturation.

What we claim is:

1. A transformer relay protection system comprising: a saturated transformer with three cores, a primary winding wound on said three cores, a source of operating potential connected to the primary winding, a secondary winding wound on the first two of said three cores, a relay connected across said secondary winding, means in circuit with said source and responsive to actuation of the relay by current flow in the secondary winding to disconnect the source from the primary winding, an auxiliary secondary winding wound on said third core, a braking winding wound on the first two of said cores, a short-circuited winding wound on the same said two cores, a rectifier connected between the auxiliary secondary winding to feed said braking winding, said relay being actuated when normal rated current of the primary reaches a predetermined value and on sudden primary current surges.

2. A transformer relay protection system comprising: a saturable transformer with three cores, a primary winding wound on said three cores, a source of operating potential connected to the primary winding, a secondary winding wound on the first two of said cores, a rectifier connected across said secondary winding, a relay connected to the output of said rectifier, contacts operable by said relay, an auxiliary secondary winding wound on said third core, a braking winding wound on the first two of said cores, a short-circuited winding wound on the same said two cores, a rectifier connected across the auxiliary secondary winding to feed said braking winding, an electromagnet having contacts in series with said source, an energizing circuit for the electromagnet in series with the relay contacts, said secondary winding actuating the relay to disconnect the source on sudden primary current surges and when the normal rated current of the primary current substantially doubles.

3. The apparatus of claim 2 wherein said braking winding comprises two coils connected in series opposition whereby the E.M.F.'s induced in the coils by the load current is opposite in direction and mutually compensating, and wherein said short-circuited winding provides time-delay of the magnetic braking flux change.

References Cited by the Examiner

UNITED STATES PATENTS

| | | | |
|---|---|---|---|
| 2,784,352 | 3/1957 | Duffing | 317—50 X |
| 2,969,495 | 1/1961 | Mosch et al. | 321—14 |
| 3,044,005 | 7/1962 | Jensen | 321—12 |
| 3,177,403 | 4/1965 | Baycura | 317—50 |

MILTON O. HIRSHFIELD, *Primary Examiner.*

SAMUEL BERNSTEIN, *Examiner.*

R. V. LUPO, *Assistant Examiner.*